Patented Sept. 23, 1952

2,611,750

UNITED STATES PATENT OFFICE 2,611,750

THERMALLY HARDENED POROUS SOLID

Chester N. White, Ridley Park, Pa., assignor to Sun Oil Company, Philadelphia, Pa., a corporation of New Jersey No Drawing. Application February 7, 1950, Serial No. 142,947

13 Claims. (Cl. 260—2.5)

This invention relates to a method of preparing a thermally hardened porous mass from solid particles comprising partially condensed thermosetting resin, and to the product, suitable as a filter medium, thereby obtained.

I have discovered that partially condensed solid thermosetting resin particles within a certain range of particle size, as subsequently specified, may be compacted into a porous mass and cured to give a mechanically strong, porous solid suitable for use as a filter medium and consisting of thermally hardened particles bonded together at a plurality of points of contact with interstices between the particles.

Resin particles employed according to the invention comprise particles substantially all of which are smaller than 10 mesh, i. e. small enough to be washed through a 10 mesh screen by a mild current of water, and substantially all of which are larger than 200 mesh, i. e. large enough that they are not washed through a 200 mesh screen by a mild current of water. Mesh sizes given herein are based on the U. S. Sieve Series. It has been found that particles meeting the above specifications as to size are capable of forming a thermally hardened solid material which has at the same time good mechanical strength and high permeability to liquids. If a substantial proportion of particles larger than 10 mesh is present in the mixture of resin particles employed, the mechanical strength of the thermally hardened solid product is impaired, and the product is brittle or crumbly. If a substantial proportion of particles smaller than 200 mesh is present, the thermally hardened solid product is insufficiently permeable to liquids to have utility as a filter medium. A preferred range of particle size is about 40–100 mesh.

Resin particles employed according to the invention comprise thermosetting resin which is condensed to an intermediate plastic solid stage at which it is dispersible in water by stirring without the aid of an emulsifying agent to form a non-colloidal suspension stable for at least five hours. It is known in the art to partially condense thermosetting resins to this intermediate plastic solid stage: U. S. Patent 2,457,160 to Kurtz et al. discloses condensing phenol or cresol with formaldehyde or furfural to this stage; and copending applications Serial Nos. 54,586; 54,587 and 54,588 by the same inventors disclose condensing melamine, urea, and thiourea respectively with formaldehyde or furfural to this stage. Phenol-formaldehyde, cresol-formaldehyde, melamine-formaldehyde, urea-formaldehyde, thiourea-formaldehyde, phenol-furfural, cresol-furfural, melamine-furfural, urea-furfural, or thiourea-furfural thermosetting resin, are examples of condensation-type thermosetting resin, condensible to an intermediate plastic solid stage at which it has the above described properties, which can be used according to the present invention.

According to the above disclosures, the reactants are condensed under conditions involving elevated temperature and in some cases acid or alkali catalysis. The condensation is continued until the intermediate plastic solid stage is reached at which the resin product, when cooled to room temperature, is a solid material having about the consistency of set gelatin, or is an elastic solid, depending upon the nature of the reactants and the condensation conditions. In order to obtain resin particles suitable for use in the invention, such solid condensation products are subdivided, as subsequently described.

Resin particles employed according to the invention are condensed to the intermediate plastic solid stage and no further, because only particles condensed thus far are capable of forming a thermally hardened solid material which has at the same time good mechanical strength and high permeability. Resin particles which have been condensed beyond the intermediate plastic solid stage are too tough to be effectively bonded together at their points of contact, with the result that the thermally hardened product obtained upon curing is deficient in mechanical strength. Resin products which have not been condensed sufficiently to reach the intermediate plastic solid stage cannot be satisfactorily subdivided into discrete particles having the required size and maintained in discrete condition long enough to be used according to the invention; some such resin products can be formed in colloidal dispersions in water with the aid of an emulsifying agent, but such colloidally dispersed particles are not suitable in the present instance, the particle size of the disperse phase being entirely too small.

Preparation of a porous solid according to the invention involves the preparation, from thermosetting resin products, partially condensed to the intermediate plastic solid stage as above specified, of discrete solid particles substantially all smaller than 10 mesh and larger than 200 mesh. Beginning with gelatinous or elastic solid products as above described, such preparation of particles involves subdivision of the product into a mixture of particles a substantial proportion of which are within the required range of particle size. Such subdivision is conveniently achieved by vigorous mechanical agitation of the solid and liquid condensation products, or a mixture of the solid condensation products with fresh water; a motor-driven mechanical agitator of the high speed rotating blade type is suitable for this purpose. The mixture of particles obtained upon mechanical subdivision of this kind contains a substantial proportion of particles smaller than 200 mesh and may also contain a substantial proportion of particles larger than 10 mesh. If present, the latter particles are removed, e. g. by washing through a 10 mesh screen with a mild current of water those particles small enough to pass through the screen. The mixture of particles passing through the screen is then treated for removal of particles smaller than 200 mesh, e. g. by washing through a 200 mesh screen with a mild current of water those particles small enough to pass through, and retaining, as the mixture of particles to be used according to the invention, those particles retained by the screen. Care is taken in the above washing operations to agitate the mixture of particles on the screen sufficiently that substantially all the particles smaller than the screen openings are enabled to reach the screen and pass therethrough.

Preparation of a porous solid according to the invention further involves shaping, into a compact mass, resin particles as above specified, substantially all smaller than 10 mesh and larger than 200 mesh. The particles in the compact mass must be arranged so that each particle is in contact with a plurality of adjacent particles, and it is preferred that the mass be compacted by the application thereto of superatmospheric pressure, because a mass thus compacted generally cures to give a product of superior mechanical strength. Care is taken in application of such superatmospheric pressure that the pressure is not so great as to compress the particles too much and thus destroy the porous nature of the mass. The maximum pressure which may be applied to a mass of particles depends on the toughness of the particles, and there is variation in toughness within the intermediate plastic solid stage; generally, it is inadvisable to apply a pressure greater than 40 atmospheres to the particle mass, and lesser pressures are indicated for relatively soft particles reacted only to an early degree of condensation within the intermediate plastic solid stage. It has been found that compacting pressures of 5–20 atmospheres are generally preferred in that thereby solid products are obtained upon curing which have optimum combinations of mechanical strength and porosity.

Formation of resin particles into a compact mass for use according to the invention may be accomplished in any convenient manner, e. g. by filtering a mixture of water and such particles through any suitable filter medium such as filter paper, to obtain an aqueous filtrate and a compact filter cake. If elevated pressure is to be applied during the compacting, a differential pressure may be applied across the filter medium, e. g. by introducing gas under pressure to an enclosed space adjacent the filter cake.

Preparation of a porous solid according to the invention further involves the curing of a compact mass of resin particles as above specified. Such curing may be done according to the practice usual for thermal hardening of thermosetting resin, though care must be exercised, in selecting the curing conditions, to preserve the porous nature of the compact mass while the latter is hardening. Although the curing may be conducted at atmospheric pressure, it is also possible to cure under superatmospheric pressure. When superatmospheric pressure is applied by means of compressed gas, a pressure transmitting medium, e. g. a substantially unfiltrable oil well drilling mud, is preferably used between the gas and the filter cake; otherwise large quantities of gas would pass through the filter cake during curing. Selection of compacting and curing temperatures and pressures which will not result in loss of porous nature in the compact mass is within the ability of a person skilled in the art.

The method by which curing conditions are applied to the compact mass of resin particles may vary. It is sometimes advantageous, when the compact mass has been formed by filtration, to cure the compact filter cake without removal from the filtration apparatus; jacketed or otherwise heatable filtration apparatus is suitable for this purpose. Other suitable curing methods include curing in an oven or in a mold.

The product obtained upon completion of the curing operation is a hard, infusible, insoluble solid having good mechanical strength and sufficient permeability to liquid to make it valuable as a filter medium. This product is macroporous, as distinguished from and liquid-permeable, as distinguished from microporous solids, unsuitable as filter media, which may be obtained by drying gels. The permeability of the solid product is a function of the size of the resin particles from which the product is made, large particle sizes generally giving products of high permeability. It is within the ability of a person skilled in the art to select, in the light of the present specification, the particle size distribution and the curing conditions which will result in the desired permeability. Generally, if the particles used contain a substantial proportion of particles smaller than 200 mesh, the solid product, though it may not be completely lacking in porous structure, has such low permeability that it has no utility as a filter medium, because it is substantially impervious to such solid-liquid slurries as are generally charged to filtration operations.

In general, the most satisfactory results are obtained when the particles used are all within a relatively narrow range of particle size, e. g. 40–60 mesh, 60–80 mesh, 80–100 mesh, etc., because the products formed are more homogeneous when this is the case; and also it is easier to control the permeability of the products formed. The range of particle sizes used to make a given product depends, as previously mentioned, upon the degree of permeability desired in the product.

Porous products prepared according to the invention have particular utility as filter media in circumstances where solids are to be filtered from hot liquids, and where a honeycombed structure is desired in the filter medium, so that the hot liquid follows a tortuous path through the filter medium. An example of such an application is in the production of mineral oil from wells, where it is frequently desirable to filter sand or other solid foreign matter from producing oil before the oil enters the well tubing which conveys it to the surface. Previously, such filtration has been accomplished by using well tubing having attached to the lower end thereof a perforated metal screen through which the producing oil, but not the sand therein, passes before it enters the tubing. There is a serious disadvantage to the use of a perforated metal screen in that the perforations must be smaller than the smallest sand particle which is to be prevented from entering the tubing. This makes it difficult to produce oil at a reasonably high rate with reasonably good exclusion of sand from the tubing; it also introduces the likelihood of the perforations in the screen being plugged up by sand particles.

Use of porous products prepared according to the invention has the advantage that the tortuous path followed by the oil makes it possible to filter small sand particles from the oil, even though the passages in the filter medium have greater average diameter than those particles. The result is that oil can be readily produced, at high rates with good exclusion of sand from the tubing and without danger of serious impairment of the filter's action by plugging filter openings. Since the filter medium is composed of thermally hardened thermosetting resin, it effectively resists the elevated temperatures encountered at the subterranean level of oil-producing sand strata.

In preparing filter media according to the invention for use in oil wells, properly sized particles of partially condensed thermosetting resin are advantageously compacted around a central cylindrical core into the shape of a hollow cylinder, and the mass thus compacted is cured to obtain a strong, porous, cylindrical solid. Curing is preferably at superatmospheric pressure, particularly when the central core is left in place during curing. It has been found that the resin mass tends to crack or split when cured at atmospheric pressure with the central core in place, whereas at superatmospheric pressure, e. g. 5–20 atmospheres, no cracking or splitting occurs either when the central core is in place or when it has been removed after compacting and before curing the resin mass. It is generally preferred to leave the central core in place and use superatmospheric pressure in curing, because products of superior mechanical strength result when this is done.

The solid hollow cylinder obtained as described above is encased in a cylindrical metal sheath having perforations substantially larger than the sand particles which are to be removed from the producing oil. The metal sheath containing the cylindrical filter medium prepared according to the invention is then attached to the lower end of the well tubing and, when set in place adjacent a producing formation, the cylindrical filter medium filters sand from producing oil before the latter enters the tubing.

In making filter media for use in oil wells, resin suspensions containing particles having sizes substantially within the range 10–200 mesh may be used, but it is preferred that the particles have sizes substantially within the range 40–100 mesh, because when this is the case, the resulting filter media may be used in oil wells with advantages in respect to oil flow rate and filtration properties. Also, when 40—100 mesh particles are used to make porous solids according to the invention for any use, elevated pressures of about 5–20 atmospheres may be used in compacting or curing or both to obtain a mechanically strong solid which still has exceptionally high permeability.

*Example*

The starting material for this example is an aqueous suspension of phenol-formaldehyde thermosetting resin partially condensed to the intermediate plastic solid stage as previously specified. The partial condensation procedure was substantially as follows:

Phenol and formalin (approximately 40 weight percent aqueous formaldehyde) are reacted at 95–100° C. in the presence of caustic soda as catalyst for about 200 minutes. The weight ratio of phenol to formalin is about ⅓. At the end of the 200 minutes, the solid resin phase is separated from the liquid reaction products, cooled to room temperature, and suspended in water, without the aid of an emulsifying agent, by agitating the resin and water in a mixing apparatus of the high speed rotating blade type, known commercially as a Waring Blendor. The resulting aqueous suspension contains dispersed solid particles, approximately half of which have sizes ranging from about 10 mesh to 200 mesh, as measured by washing the suspension through standard screens and measuring the proportion of particles retained by each screen; the other particles approximately half of the total, have sizes smaller than 200 mesh.

Beginning with the aqueous suspension prepared as described above, containing the full range of particle sizes obtained upon mixing in the Waring Blendor, that starting material is first washed through a 40 mesh screen. The suspension which passes through the screen, containing particles smaller than 40 mesh, is then washed through a 60 mesh screen. The particles retained by the 60 mesh screen have sizes within the range 40–60 mesh, and these are placed on filter paper having an enclosed space thereabove to which nitrogen is admitted to build up the pressure on the particles to about 7 atmospheres, thereby to express liquid from and compress the particles into a compact, porous filter cake, which is removed from the filtration apparatus and cured in an oven at 230° F. for 3 hours. The product is a hard porous solid having good mechanical strength, being neither brittle nor crumbly.

The suitability of the product as a filter medium is gauged approximately by measuring its permeability, which is found to be greater than 33,000 millidarcies, or 33 darcies, the darcy being a standard unit expressing the permeability of solid materials to fluids. Since a permeability of about 1500 millidarcies is sufficient for many applications of filter media, it is readily seen that this product has sufficient permeability for advantageous use as a filter medium. Solid products prepared in a similar fashion from the same starting material, but without removing the particles smaller than 200 mesh, have permeabilities substantially less than 1500 millidarcies and are therefore not generally suitable as filter media.

Although in the above example the desired range of particle size was obtained by agitating to produce a mixture containing particles both larger and smaller than 40 mesh and then screening out those larger than 40 mesh and smaller than 60 mesh, it is within the scope of the invention to agitate more vigorously and/or for a longer time to produce a mixture containing substantially no particles larger than the desired maximum, e. g. 40 mesh, and then to screen out those smaller than the desired minimum, e. g. 60 mesh. It is also within the scope of the invention to use other agitating means than the type heretofore specified; e. g. a ball mill may be used. Also, other means than screening, e. g. flotation methods, may be used for particle size separation.

I claim:

1. The method of making a strong, thermally hardened, liquid-permeable solid which comprises: removing particles substantially smaller than 200 mesh from a mixture of discrete solid particles substantially all smaller than 10 mesh, said particles comprising partially condensed thermosetting resin selected from the group consisting of phenol-formaldehyde, cresol-formaldehyde, melamine-formaldehyde, urea-formaldehyde, thiourea-formaldehyde, phenol-furfural, cresol-furfural, melamine-furfural, urea-furfural, and thiourea-furfural resin, said resin being in an intermediate plastic solid stage of condensation at which it is dispersible by stirring in water without the aid of an emulsifying agent to form a non-colloidal suspension stable for at least five hours, thereby forming by said removing a mixture of sized particles from which particles smaller than 200 mesh have been removed; shaping said sized particles into a porous compact mass; and curing said compact mass by heat.

2. Method according to claim 1 wherein said resin is phenol-formaldehyde resin.

3. Method according to claim 1 wherein said mixture of sized particles is shaped into a porous compact mass under a pressure within the approximate range 5–20 atmospheres.

4. Method according to claim 1 wherein said compact mass is cured under a pressure within the approximate range 5–20 atmospheres.

5. Method according to claim 1 wherein said mixture of discrete solid particles substantially all smaller than 10 mesh has been previously prepared by removing particles larger than 10 mesh from a mixture containing particles both larger than 10 mesh and smaller than 200 mesh.

6. Method according to claim 1 wherein said mixture of discrete solid particles substantially all smaller than 10 mesh has been previously prepared by vigorously agitating a mixture of water and precipitated, partially condensed thermosetting resin, thereby to obtain an aqueous suspension of a mixture of discrete solid particles substantially all smaller than 10 mesh.

7. Method according to claim 1 wherein said shaping into said porous compact mass is effected by filtering an aqueous suspension of said mixture of sized particles to obtain an aqueous filtrate and a filter cake comprising said porous compact mass.

8. Method according to claim 7 wherein said shaping into said porous compact mass is effected by filtering an aqueous suspension of said mixture of sized particles in the annular space of a cylindrical filter containing a central cylindrical core, thereby to obtain an aqueous filtrate and a hollow cylindrical filter cake comprising said porous compact mass.

9. The method of making a strong, thermally hardened, porous, hollow cylindrical solid suitable for use as a filter medium adjacent subterranean oil-producing formations which comprises: vigorously agitating a mixture of water and partially condensed precipitated thermosetting resin selected from the group consisting of phenol-formaldehyde, cresol-formaldehyde, melamine-formaldehyde, urea-formaldehyde, thiourea-formaldehyde, phenol-furfural, cresol-furfural, melamine-furfural, urea-furfural, and thiourea-furfural resin, said resin being in an intermediate plastic solid stage of condensation at which it is dispersible by stirring in water without the aid of an emulsifying agent to form a non-colloidal suspension stable for at least five hours; thereby obtaining by said agitating an aqueous mixture of discrete solid resin particles, a substantial proportion of which are within the range of particle size 40–100 mesh; removing from said aqueous mixture particles substantially larger than 40 mesh and particles substantially smaller than 100 mesh, thereby to form an aqueous suspension of sized particles from which particles smaller than 100 mesh and larger than 40 mesh have been removed; filtering said aqueous suspension of sized particles in the annular space of a cylindrical filter containing a central cylindrical core, thereby to obtain an aqueous filtrate and a hollow cylindrical filter cake; and curing by heat said filter cake around said cylindrical core at a pressure within the approximate range 5–20 atmospheres.

10. A strong, thermally hardened, liquid-permeable solid prepared according to the method of claim 1.

11. A strong, thermally hardened, liquid-permeable solid prepared according to the method of claim 1 and consisting essentially of 40–100 mesh particles.

12. A hollow cylindrical, strong, thermally hardened, liquid-permeable, solid prepared according to the method of claim 1.

13. A strong, thermally hardened, liquid-permeable solid prepared according to the method of claim 1 and consisting essentially of phenol-formaldehyde resin.

CHESTER N. WHITE.

REFERENCES CITED

The following references are of record in the file of this patent:

UNITED STATES PATENTS

| Number | Name | Date |
|---|---|---|
| 2,189,889 | Engel | Feb. 13, 1940 |
| 2,297,248 | Rudolph | Sept. 29, 1942 |
| 2,371,868 | Berg et al. | Mar. 20, 1945 |
| 2,395,301 | Sloan | Feb. 19, 1946 |
| 2,400,091 | Alfthan | May 14, 1946 |
| 2,457,160 | Kurtz et al. | Dec. 28, 1948 |

OTHER REFERENCES

Hower, World Oil, Dec. 1949, pages 170–172.

Badger and McCabe, Elements of Chem. Engineering, 2nd edition, 1936, pp. 558, 559, pub. by McGraw-Hill.